F. S. CARR.
FASTENING DEVICE.
APPLICATION FILED MAR. 6, 1908.
916,995.
Patented Apr. 6, 1909.
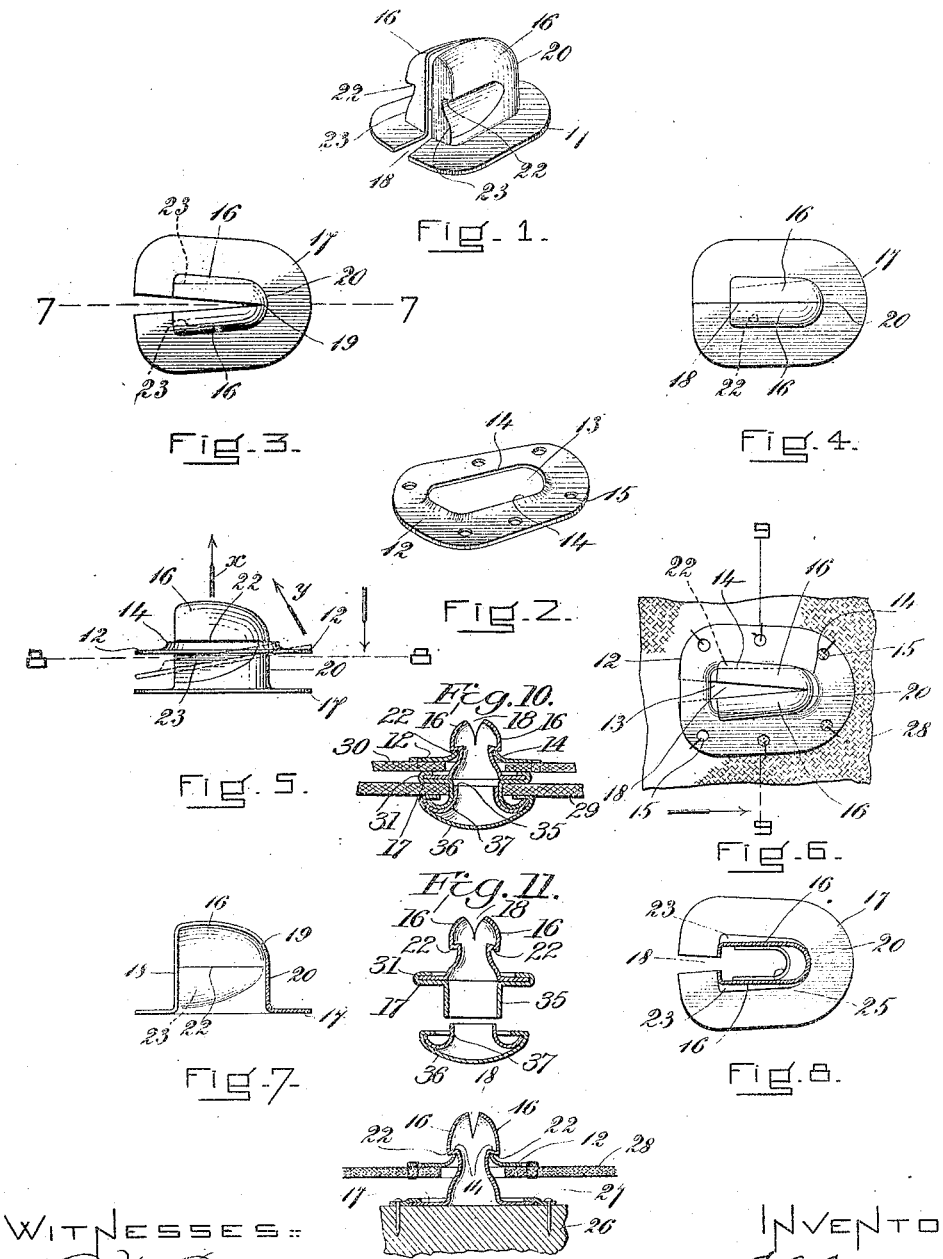

UNITED STATES PATENT OFFICE.

FRED S. CARR, OF BROOKLINE, MASSACHUSETTS, ASSIGNOR TO CARR FASTENER COMPANY, OF BOSTON, MASSACHUSETTS, A CORPORATION OF MAINE.

FASTENING DEVICE.

No. 916,995.   Specification of Letters Patent.   Patented April 6, 1909.

Application filed March 6, 1908. Serial No. 419,476.

*To all whom it may concern:*

Be it known that I, FRED S. CARR, of Brookline, in the county of Norfolk and State of Massachusetts, have invented certain new and useful Improvements in Fastening Devices, of which the following is a specification.

This invention relates to stud and socket fasteners for various purposes, such as the securing together of overlapping parts of garments and other articles for personal wear, such as gloves, and for securing carriage curtains, etc.

The invention has for its object, first, to provide a resilient sheet metal stud member of improved construction whereby opposite side portions of the stud member are adapted to approach and recede from each other to contract and expand the stud, and an effective and durable spring is provided, adapted to normally hold the stud in an expanded condition with sufficient force to prevent liability of its accidental disengagement with the accompanying socket member, the latter being of rigid, or non-resilient construction.

The invention also has for its object to provide a stud and socket fastener, adapted to be interlocked in such manner that they will be inseparable by a direct outward pull or strain, such as would naturally be exerted by the ordinary conditions of use, and will be separable only by a strain in a different direction, the stud member being of compressible construction, and normally yieldingly expanded to engage the socket member, the compressibility of the stud member being such that it may be contracted to permit its separation from the socket member by a special or abnormal movement of the latter.

The invention consists in the improvements which I will now proceed to describe and claim.

Of the accompanying drawings, forming a part of this specification,—Figure 1 represents a perspective view of the stud member of the fastening device embodying my invention. Fig. 2 represents a perspective view of the socket member of said device. Fig. 3 represents a top plan view of the stud member showing the same in its normal expanded condition. Fig. 4 represents a view similar to Fig. 3, showing the stud member compressed or laterally contracted to permit its disengagement from the socket member. Fig. 5 represents a side view showing the stud and socket members engaged with each other. Fig. 6 represents a top plan view showing the two members in the condition represented in Fig. 5. Fig. 7 represents a section on line 7—7 of Fig. 3. Fig. 8 represents a section on line 8—8 of Fig. 5. Fig. 9 represents a section on line 9—9 of Fig. 6, showing the parts with which the stud and socket members are or may be engaged, when the invention is embodied in a carriage curtain fastener. Fig. 10 represents a view similar to Fig. 9, showing the stud member engaged with a different form of holder. Fig. 11 represents a sectional view showing the parts of the holder, shown in Fig. 10, before they are assembled.

The same characters of reference indicate the same parts in all the figures.

In the drawings, 12 represents a socket member, which is here shown as a flat plate having an orifice 13, the edges 14 14 of which form jaws which are practically rigid and immovable relatively to each other. The socket member 12 may be attached in any suitable way to the part which carries it, holes 15 being here shown, adapted to receive attaching stitches or other means for securing the socket member.

It may be here stated that the socket member and the stud member, hereinafter described, may be made of any size desired, the size depending on the use to which the fastener is to be put, it being obvious that for gloves and garments, the size of the parts of the members of the fastener will be very much smaller than when the fastener is used for such purposes as securing carriage curtains and the like.

The stud member shown in Figs. 1 to 9, inclusive, is a hollow sheet metal post which is here shown as formed from sheet metal in a single piece with a flange 17, the latter being adapted to be secured to the part which carries the stud member. One side of the post is entirely split longitudinally by a slot or opening 18, which extends across the flange 17, and crosswise in the top or head of the post, the slot terminating at 19 (Fig. 7). The post is split through one side only, its wall being closed and continuous excepting at the side where the slot 18 is formed, so that the post has side portions 16 and a neck portion 20 connecting said side portions, the whole constituting a U-shaped spring which is reinforced by the corresponding closed or uncut portion of the flange 17, and is normally expanded to hold the two side portions 16 separated from each other, as shown in Figs. 1, 3, 6 and 8. The outer sides of the side portions 16 are provided with recesses, which are of such form as to create shoulders 22, and inclined faces 23 which are located below said shoulders, the shoulders 22 overhanging the inclined faces 23. When the stud member is in its normal expanded condition, the portions of the faces 23 immediately under the shoulders 22 are substantially parallel with each other, as indicated by dotted lines in Fig. 3, and are adapted to engage the jaws 14 of the socket member, the shoulders 22 overhanging said jaws, as shown in Fig. 6, and preventing the removal of the stud member from the socket member. The faces 23 are inclined outwardly from their junction with the shoulders 22, and are so formed that when the socket member 12 is inclined as indicated by dotted lines in Fig. 5, the pressure of the jaws on said inclined faces will force the sections 16 together, as shown in Fig. 4, far enough to disengage the said shoulders from the jaws 14, and permit the removal of the socket member from the stud member in the direction indicated by the arrow $y$ in Fig. 5. When the socket member is substantially parallel with the base of the stud member, as shown by full lines in Fig. 5, the jaws 14 bear squarely against the shoulders 22, so that the socket member cannot be removed from the stud member by a direct outward pull in the direction indicated by the arrow $x$ in Fig. 5. The portions of the stud member section 16 above the shoulders 22 are inclined so that the top of the stud member is narrower than the space between the outer ends of the shoulders 22. Hence when the socket member is forced downwardly into the stud member, its jaws 14 will press inwardly against the inclined sides of the portions 16, and compress the socket member laterally until the jaws pass below the shoulders 22, when the stud member will expand by the resilience of its neck portion, and thus cause the interlocking of the shoulders 22 with the jaws 14. Thereafter, the two members will be inseparable by direct outward strain in the direction of the arrow $x$, this being the direction of the strain ordinarily exerted, tending to separate the two members, the said members being separable only by strain in the abnormal direction of the arrow $y$.

It will be seen from the foregoing that so long as the engaging faces of the shoulders 22 and the jaws 14 are in substantially parallel planes, as indicated by full lines in Fig. 5, the said members are practically inseparable, it being necessary to move the jaws out of parallelism with the engaging faces of the shoulders, in order to cause a separation of the two members. If desired, a spring 25 may be interposed between the stud sections 16, as shown in Fig. 8, said spring reinforcing the spring provided by the closed side portion of the stud.

It will be seen by reference to Fig. 9 that the shoulders 22 of the stud member are inclined downwardly and outwardly from the sides of the stud, and that the jaws 14 of the socket member are offset and inclined in such manner as to engage and interlock with the inclined shoulders 22 and prevent movement of the side portions of the stud toward each other so long as the members are normally engaged, and the socket member is subjected to pressure in any direction excepting that indicated by the arrow $y$. Accidental contraction of the stud member is therefore prevented by the socket member under ordinary conditions of use.

When the stud member is a part of a carriage curtain fastener, or other like device, requiring a rigid support for the stud member, such as a post 26, the flange 17 may be loosely confined by an overhanging offset flange 27 (Fig. 9) attached to the post, and permitting the expanding and contracting movements of the portions of the stud and its flange which are separated by the slot. In Fig. 9, 28 represents a carriage curtain to which the socket member is affixed.

When the stud member is to be applied to a flexible article such as a portion of a garment, the flange 17 may be attached directly to the flexible article by stitches or other fastenings and the flange 17 may have holes 15 like those in the socket member, to receive attaching stitches.

In Figs. 10 and 11, I show suitable means for securing the stud member to the part 29 of a glove or other flexible article, said part being overlapped by a part 30 to which the socket member 12 is affixed. In this embodiment of the invention, the flange 17 of the stud member is loosely held in a chamber 31 formed on the outer end of an eyelet 35 which is passed through the part 29 and spread or upset in a hollow cap 36 having an anvil 37. The flange 17 is movable edgewise in the chamber 31 sufficiently to permit the described contraction and expansion of the stud.

It will be observed by reference to Figs. 3 and 6, that the opposite ends of the stud in which the recesses are formed diverge from the end of the stud opposite the slot 18, the end in which the slot is formed being normally wider than the opposite closed end. It will be observed also that the width of the shoulders 22 decreases from the wider end of the stud, said shoulders disappearing at the narrower end of the stud. This formation of the stud and shoulders enables the stud to be contracted by upward pressure of the socket jaws 14 against the vanishing ends of the shoulders 22, in the direction indicated by the arrow $y$, as well as by downward pressure of said jaws against the inclined sides 23. In fact the contraction of the stud may be caused wholly by the said upward pressure of the jaws.

As has been stated, the post or head of the stud member is entirely split longitudinally through one side and crosswise in its outer end. As shown in Fig. 7, the slot terminates at 19. This leaves a closed substantially straight back which is parallel with the longitudinal axis of the stud member and which constitutes a spring hinge which normally causes the side portions of the stud to be spread so that the socket member will be retained under the abrupt shoulders of the stub members.

I claim:—

1. A hollow sheet metal stud member having opposite indentations which form abrupt jaw-engaging shoulders, which decrease in width from one end to the other, and a slot extending longitudinally through one side portion of the stud between said shoulders and crosswise in the outer end portion of the stud, the portions of the stud between which the slot is located, including said shoulders, being movable toward and from each other to contract and expand the stud, while the opposite side portion of the stud is closed and constitutes a spring which yieldingly expands the stud, the sides of the stud above the shoulders diverging from the narrower toward the wider ends of the shoulders.

2. A fastener composed of a socket member having a pair of substantially rigid jaws, and a stud member having abrupt shoulders on opposite sides, adapted to positively engage said jaws to prevent separation of the members by a pull in the direction of the axis of the stud member while the engaging faces of the shoulders and the jaws are in parallel planes, the stud member being compressible and yieldingly maintained in an expanded condition, and provided with additional parts to act upon said jaws, and cause the compression of the stud member when the said faces are moved out of parallel planes.

3. A fastener composed of a socket member having a pair of substantially rigid jaws, and a stud member having abrupt shoulders on opposite sides, adapted to positively engage said jaws to prevent separation of the members by a pull in the direction of the axis of the stud member while the engaging faces of the shoulders and the jaws are in parallel planes, the stud member being composed of two side portions connected by a resilient neck, whereby the head is normally expanded laterally, and provided with additional parts to act upon said jaws, and cause the lateral compression of the stud member when the said faces are moved out of parallel planes.

4. A hollow sheet metal stud member split longitudinally and having two outer walls substantially parallel with each other and with the split and formed with recesses which vanish toward one end, the upper portions of said recesses forming abrupt shoulders.

5. A fastener comprising a stud member having side portions which are normally expanded, and are movable toward each other to contract the stud, said side portions having shoulders which are inclined downwardly and outwardly from the sides of the stud, and a socket member having rigid opposed jaws which are offset from the plane of the socket member and adapted to engage said inclined shoulders to prevent the contraction of the stud member as set forth.

6. A hollow sheet metal stud member split longitudinally through one side and crosswise in its outer end or head, the said member having a closed substantially straight back substantially parallel with the longitudinal axis of said stud member and constituting a spring hinge.

In testimony whereof I have affixed my signature, in presence of two witnesses.

FRED S. CARR.

Witnesses:
C. F. BROWN,
P. W. PEZZETTI.